(12) United States Patent
Reiman et al.

(10) Patent No.: US 8,979,172 B2
(45) Date of Patent: Mar. 17, 2015

(54) VEHICLE SIDE FAIRING SYSTEM

(75) Inventors: James Reiman, Winnetka, IL (US); Peter Heppel, Paris (FR); Raymond J. Vanassche, Louisville, KY (US); Richard Glowe, Livonia, MI (US); Christopher Vipperman, Livonia, MI (US)

(73) Assignee: Aerofficient, LLC, Livonia, MI (US)

( * ) Notice: Subject to any disclaimer, the term of this patent is extended or adjusted under 35 U.S.C. 154(b) by 0 days.

(21) Appl. No.: 13/576,641

(22) PCT Filed: Feb. 4, 2011

(86) PCT No.: PCT/US2011/023728
§ 371 (c)(1),
(2), (4) Date: Mar. 14, 2013

(87) PCT Pub. No.: WO2011/097466
PCT Pub. Date: Aug. 11, 2011

(65) Prior Publication Data
US 2013/0181477 A1    Jul. 18, 2013

Related U.S. Application Data

(60) Provisional application No. 61/301,941, filed on Feb. 5, 2010.

(51) Int. Cl.
B62D 35/00 (2006.01)

(52) U.S. Cl.
CPC .................................... B62D 35/001 (2013.01)
USPC ....................................................... 296/180.4

(58) Field of Classification Search
CPC ........................... B62D 35/001; B62D 35/008
USPC ............................................ 296/180.1, 180.4
See application file for complete search history.

(56) References Cited

U.S. PATENT DOCUMENTS

| | | | | | |
|---|---|---|---|---|---|
| 2,605,119 | A | * | 7/1952 | Earnest | 280/849 |
| 5,280,990 | A | * | 1/1994 | Rinard | 296/180.1 |
| 5,921,617 | A | * | 7/1999 | Loewen et al. | 296/180.4 |
| 7,578,541 | B2 | * | 8/2009 | Layfield et al. | 296/180.2 |
| 7,806,464 | B2 | * | 10/2010 | Cardolle | 296/180.4 |
| 7,942,466 | B2 | * | 5/2011 | Reiman et al. | 296/180.4 |
| 8,186,745 | B2 | * | 5/2012 | Graham et al. | 296/180.1 |
| 2006/0152038 | A1 | * | 7/2006 | Graham | 296/180.1 |
| 2009/0212595 | A1 | * | 8/2009 | Heppel et al. | 296/180.4 |

* cited by examiner

Primary Examiner — Joseph D Pape
(74) Attorney, Agent, or Firm — Fitzpatrick, Cella, Harper & Scinto

(57) ABSTRACT

A vehicle side fairing having a first fairing panel fixedly secured to the underside of a trailer box, and a second fairing panel coupled to the wheel set so that the second fairing panel moves with an adjustment in the position of the wheel set.

2 Claims, 20 Drawing Sheets

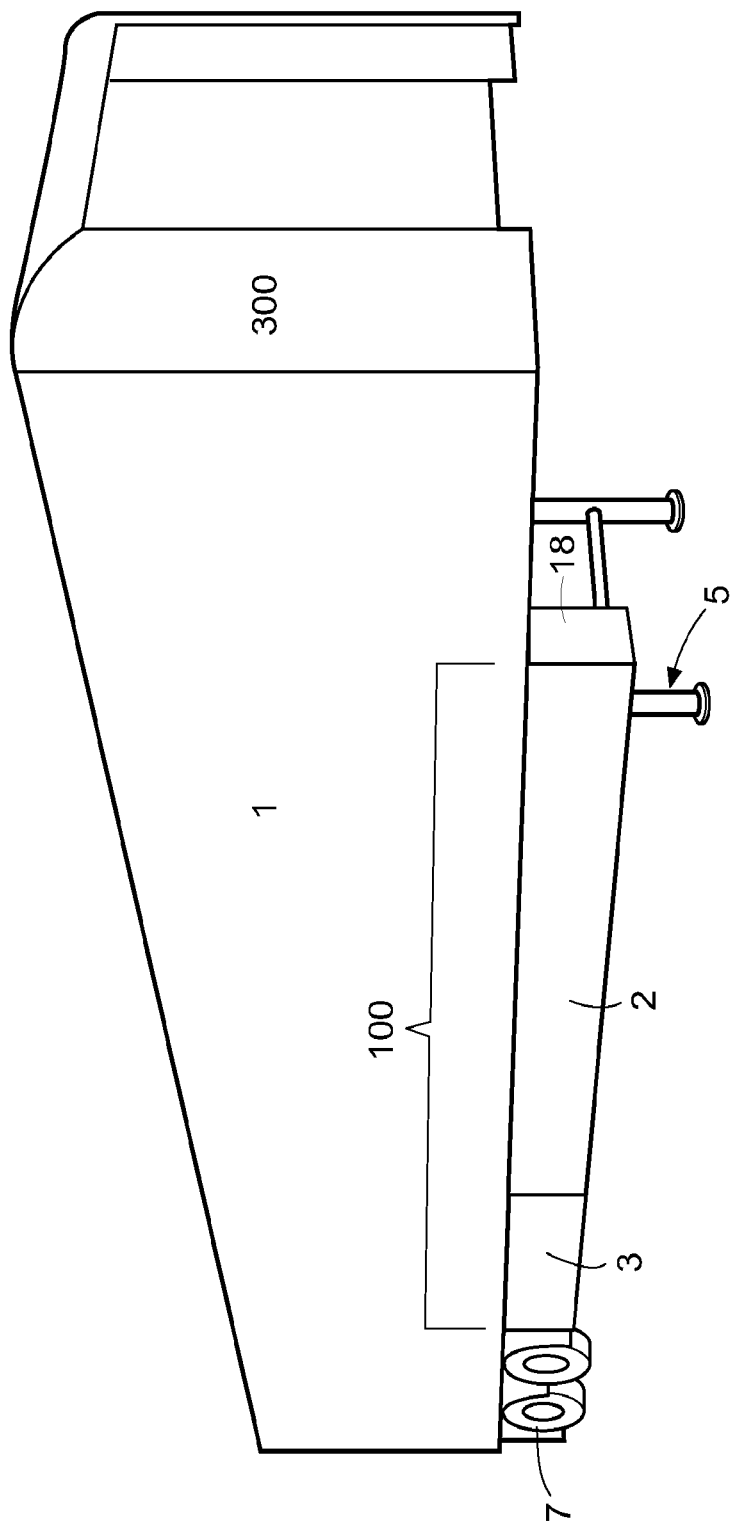

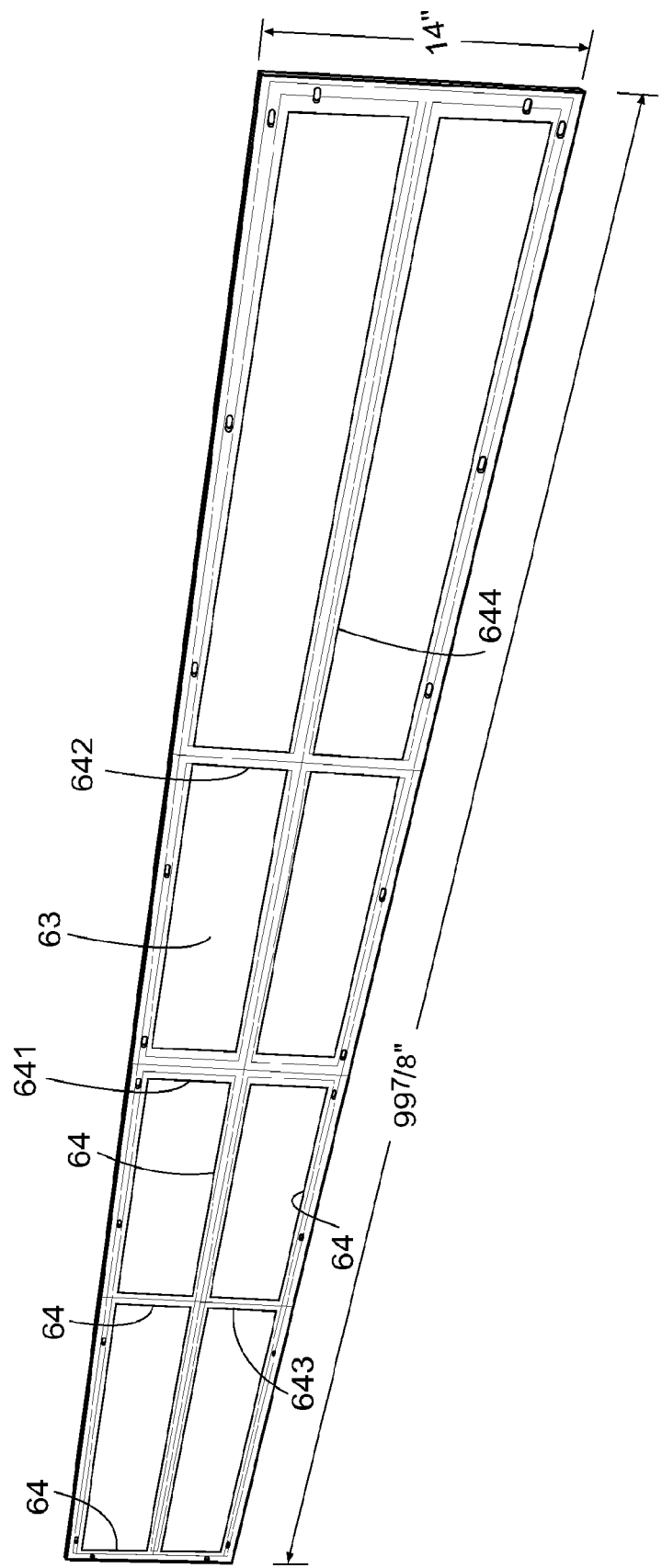

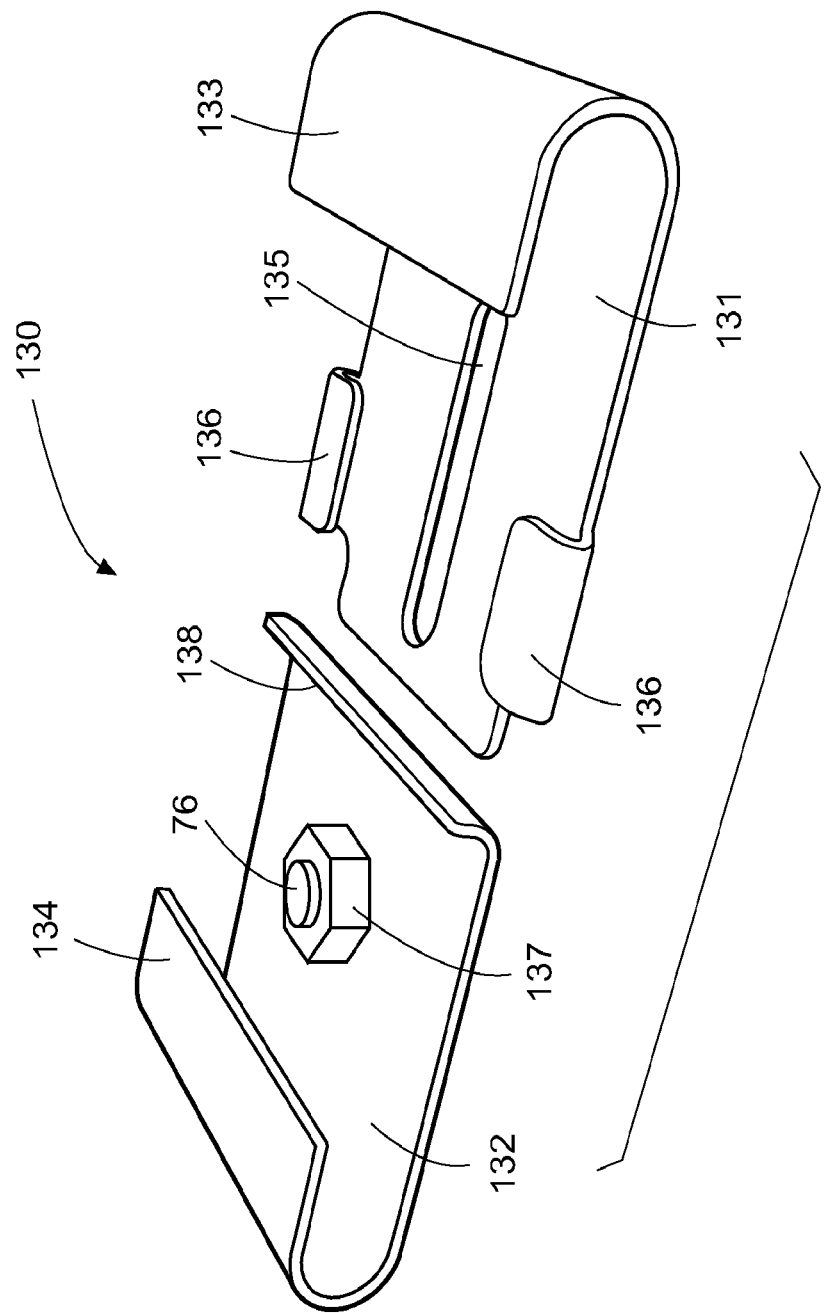

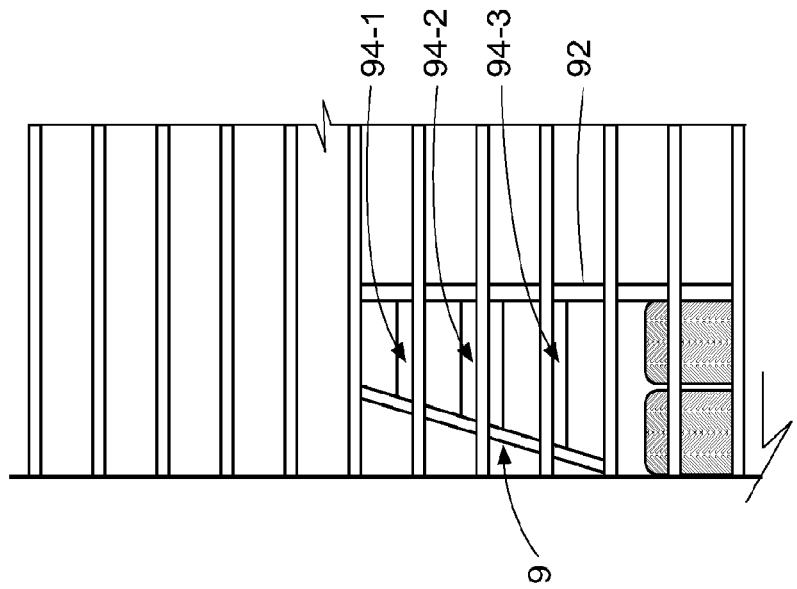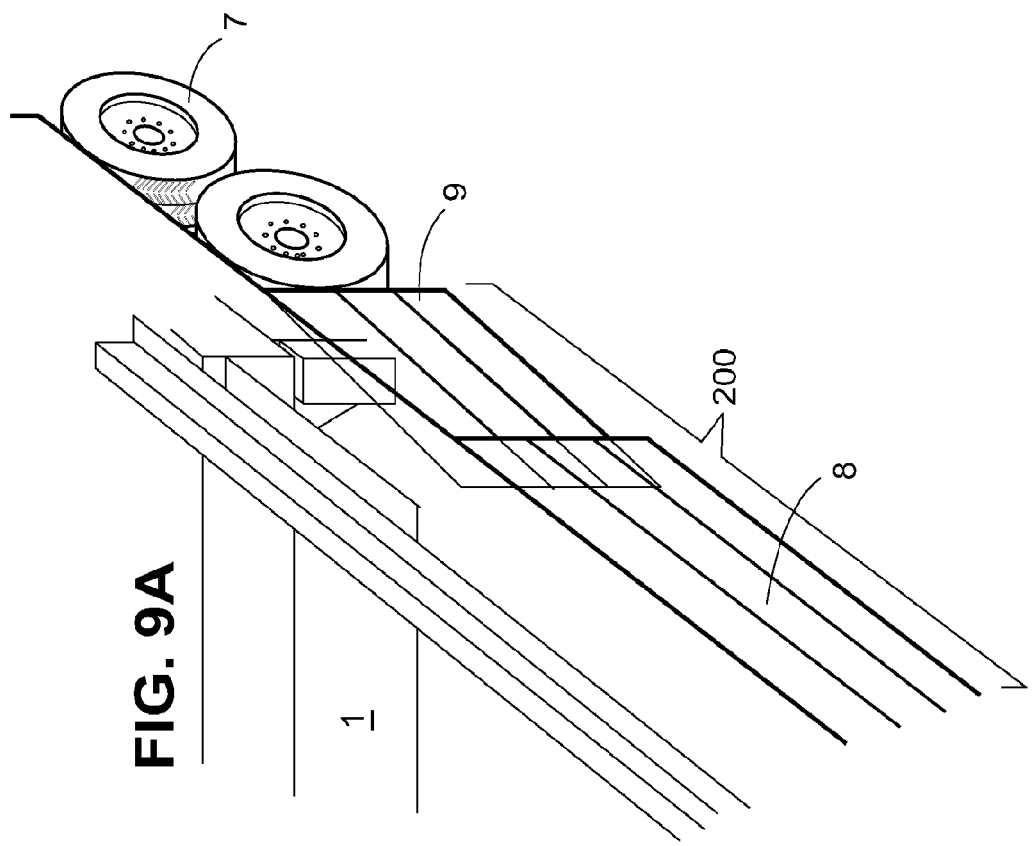
FIG. 9A
FIG. 9B

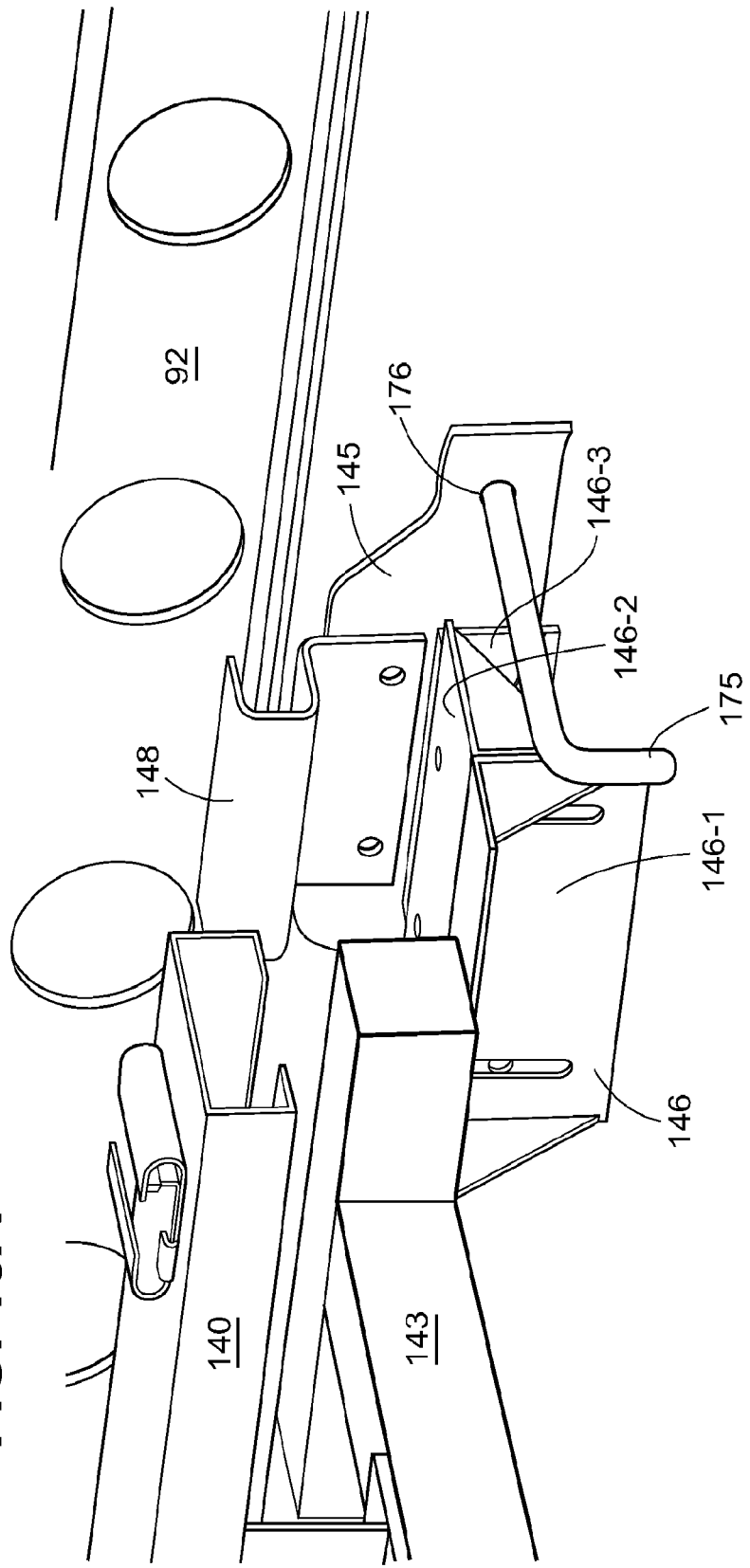

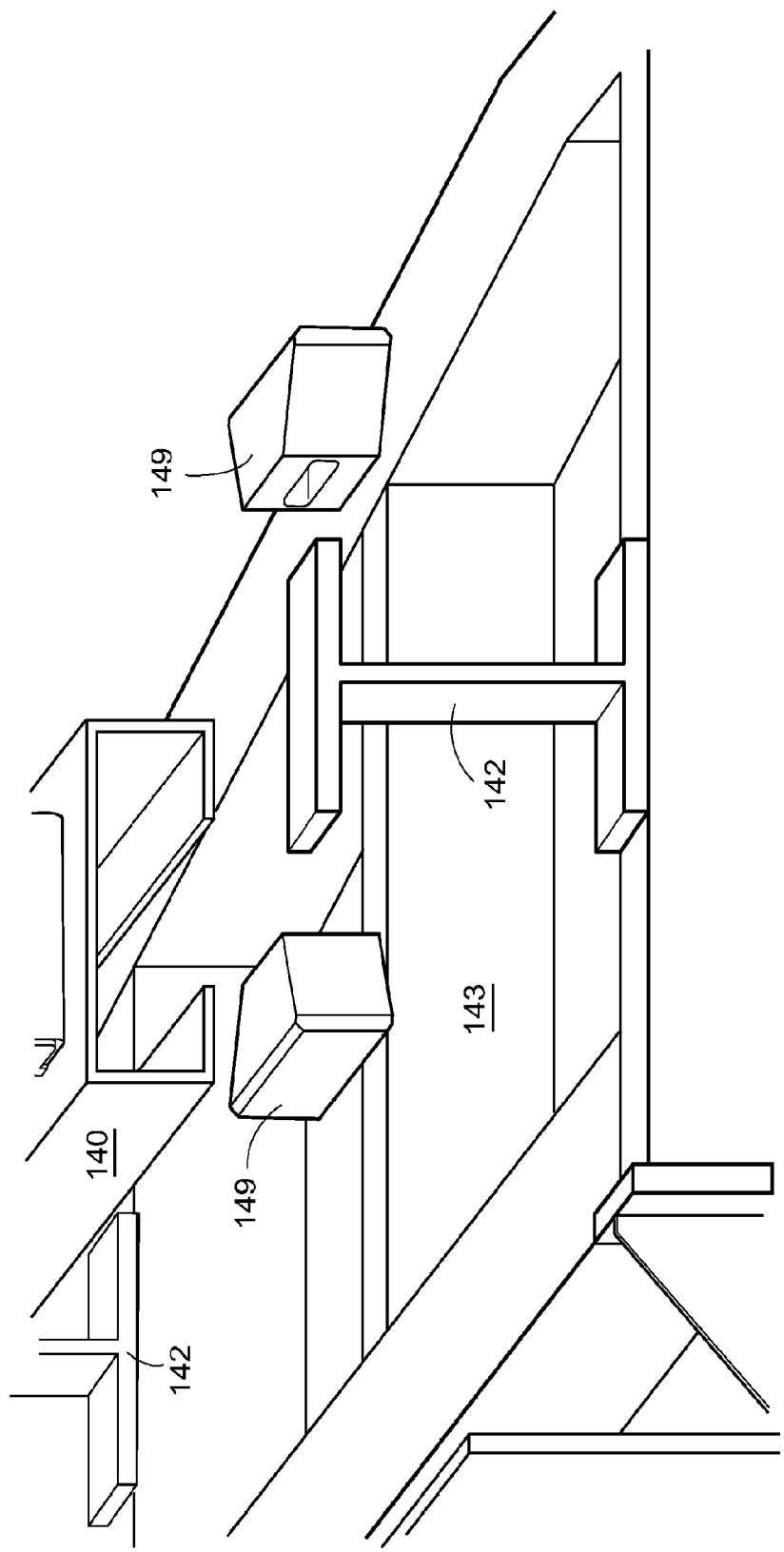

VEHICLE SIDE FAIRING SYSTEM

CROSS REFERENCE TO RELATED APPLICATIONS

This application is a national stage of International Patent Application No. PCT/US2011/023728, filed Feb. 4, 2011, which claims benefit from U.S. Provisional Application No. 61/301,941, filed Feb. 5, 2010, the entire contents of which are incorporated herein by reference.

BACKGROUND OF THE INVENTION

1. Field of the Invention

This invention relates to a system for improving the aerodynamic profile of vehicles by utilizing side vehicle fairing structures, especially for use on a trailer ("Trailer") of a tractor-trailer truck ("Truck"). The system improves fuel consumption without having a material adverse impact on operation or service procedures pertinent to the Truck or Trailer.

2. Description of Related Art

The amount of power needed to move a vehicle over land or through the air increases with the speed of the vehicle due to aerodynamic drag. The amount of power necessary to overcome aerodynamic drag directly translates into increased fuel consumption, and thus increased emission of greenhouse gases and pollutants, and increased cost of operation.

A variety of innovations aimed at reducing the aerodynamic drag of various transport vehicles, including tractor-trailer combinations, have been introduced in the prior art. These include efforts to make the hood, windscreen, fenders, etc. more streamlined in form, as well as by adding fairings to the cab roof, and in some cases, to the Trailer box.

U.S. Pat. No. 6,799,791 discloses a vehicle fairing structure that may be deployed on the rear of a Trailer box to reduce drag at the rear end of the Trailer box. Since a significant amount of drag is also associated with the front of the Trailer box, where there is known to be an area of high pressure and relatively stagnant air approximately at the middle of the forward vertical face of the Trailer cab, a front fairing structure for reducing this drag is disclosed in U.S. Pat. No. 7,604,284. A system that includes side fairings to further reduce drag is disclosed in U.S. Pat. No. 7,404,592. The disclosures of U.S. Pat. Nos. 6,799,791, 7,604,284 and 7,404,592 are incorporated herein by reference.

The invention disclosed herein is to further optimize the design of the vehicle side fairing, and to incorporate features that take into account the real-world nature of Truck operation.

SUMMARY OF THE INVENTION

The present invention functions to smooth the flow of air across the sides of a Truck's Trailer by reducing air flow disruptions and resultant aerodynamic drag (i) between the rear tires of a Truck's tractor and the wheels of the Trailer, (ii) under the Trailer (iii) in and around the Trailer's wheel assembly ("Bogies"), and (iv) in and around the Trailer's landing gear assembly ("Landing Gear"). This is accomplished by closing, or at least reducing, the "gap" between (i) the rear wheels of a Truck's tractor and the Trailer's wheels, and (ii) the bottom of the Trailer and the ground. Additionally, this is accomplished by deflecting air away from and around the Landing Gear. The present invention is a device to fill, or at least reduce in effect, such gap so as to reduce the flow of air into and/or exiting from such gap, and to improve airflow around the Landing Gear so as to reduce air flow disruptions.

It is customary for Truck operators to balance the weight and to customize the turning radius of each Truck each load carrying trip, where the Trailer provides a means to accomplish this. In particular, Trailers are often equipped with Bogies that can be repositioned in the fore and aft direction while the Trailer is on the road. In such cases, this is accomplished in part by moving the Trailer's Bogies forward or backward before or after the Trailer is loaded depending upon the amount of weight in the Trailer, the location of the weight in the Trailer, and the type of road that the Trailer will ride on when carrying such load.

The fairing system of the present invention accommodates the movement of a Trailer's Bogies. In one embodiment of the present invention, such accommodation is achieved by providing a rear fairing panel, mounted in a cantilevered manner, that moves with the Bogies.

It is common for Trailers operating in higher latitude climates to experience snow and ice build-up on their undersides during inclement winter weather. The fairing system of the present invention incorporates multiple design elements and materials that lessen such build-up, and which naturally shed whatever snow/ice does that accumulate.

It is common for Trailers to hit or roll over small obstructions such as curbs, roadside barriers, snow banks and other objects. As a result, any aerodynamic fairings on the sides of Trailers between the surface of the road and the bottom of the Trailer must be (i) sufficiently narrow to provide adequate clearance, or capable of flexing over or around such obstructions, and (ii) able to withstand occasional contact with such obstructions.

The present invention incorporates impact amelioration sections which can withstand normal operator errors resulting in occasional contact with roadway obstructions. In addition, the present invention permits its lower half to bend inwardly and outwardly when encountering an obstruction.

Further, the present invention can be constructed of light weight, interchangeable panels that are readily attached or removed, as by the operator in the field, with no advance training and with use of common tools if a portion of the invention is damaged.

When a Trailer is not attached to a tractor, its front end is supported by its Landing Gear "legs" which partially retract when the Trailer is attached to a tractor. Further, when Trailers are not attached to a tractor it is common for them to be parked parallel to each other with very narrow spacing Trailer to Trailer to maximize the number of Trailers parked in a given area. As a result, access to the Trailer's Landing Gear (which must be retracted when the Trailer is attached to a tractor to be pulled) is limited. Therefore, any aerodynamic device along the sides of a Trailer must be located either rearward of the Trailer's Landing Gear or be designed to grant access to the Landing Gear in very tight spaces.

It is common for Trailers to be loaded onto railroad cars and transported long distances by train. This operation is called "Intermodal Operations." During Intermodal Operations a Trailer is physically lifted by a lifting machine and carried from a ground loading area to the applicable railcar and then lowered onto the railcar. Industry standard lifting machines insert "fingers" under the Trailer box in a designated area on each side of the rear of the Trailer and also in a designated area on each side of the front of the Trailer.

The present invention facilitates Intermodal Operations by virtue of its design, which presents no obstruction to interfere with the operation of industry standard Intermodal Operation lifting machines.

There is not one standard size or type of Trailer in the trucking industry, but rather a variety of types and configurations. For example, in North America Trailers can be 28, 32, 34, 36, 40, 45, 48 or 53 feet in length. Trucks may pull one Trailer, or more than one Trailer. For multiple Trailer configurations, there are pup trailers, which are usually between 26 and 32 feet long. The Bogies of Trailers can have a single axle or a twin axle, and may be configured to move fore and aft, or may be located at a fixed position. To accommodate the different Trailers utilized by the trucking industry, the present invention features four (4) different configuration options: a) a fixed fairing which does not expand/contract with any Bogie movement (even if provided for), with the Landing Gear "wrapped" by the fairing structure ("Fixed with Landing Gear Wrap"); b) a fixed fairing which does not expand/contract with any Bogie movement (if provided for), with the front of the fixed fairing "toed-in" behind the Landing Gear ("Fixed with Toe-in"); 3) a Fixed with Landing Gear Wrap fairing plus an extension at the rear/back end of the fixed fairing structure which "expands/contracts" (i.e., moves fore and aft) when the Bogies move, with the front end of the fixed fairing structure Landing Gear wrapped ("Slider, with Landing Gear Wrap"), and 4) a Fixed with Landing Gear Wrap fairing plus an extension at the rear/back end of the fixed fairing structure which expands/contracts when the Bogies move, with the front end of the fixed fairing structure "toed-in" behind the Landing Gear ("Slider, with Toe-in").

The features yielding these functions, and the beneficial cooperation between the features of the present invention, are described further below.

BRIEF DESCRIPTION OF THE DRAWINGS

FIG. 3C depicts a subpanel that can be used to fabricate the sections and subsections of the vehicle side fairing panel.

FIG. 5 depicts a beam clamp system utilized in the preferred embodiment of the present invention.

FIGS. 7, 8 9, 10 and 11 depict means for mounting the rear fairing panel to the Trailer and Bogies in a cantilevered manner.

FIG. 13A depicts the trilateral Bogie rail adjustment assembly 146 as mounted on a Trailer.

FIG. 14B is an exploded view depicting how the shoes are oriented when placed on the upper flange of I-beam 142

DETAILED DESCRIPTION OF THE PREFERRED EMBODIMENTS

Figure 1A:
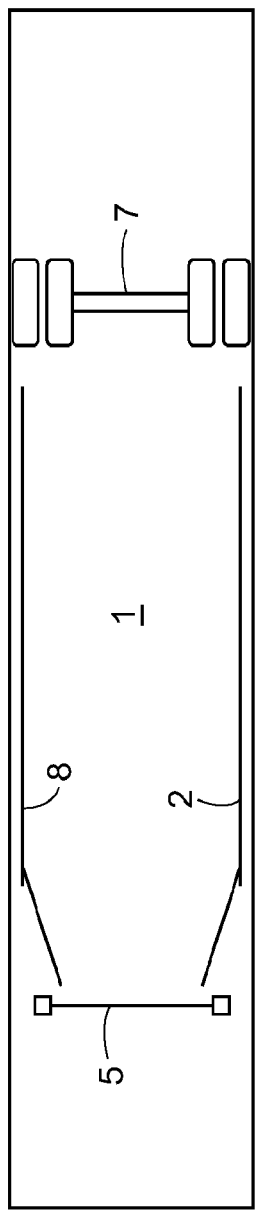
FIG. 1A is a bottom view of four different Trailers, each of which depicts one of the configuration options described above.

FIG. 1 generally depicts a Trailer 1 with the side fairing invention 100 described herein. It is also shown depicted with a front gap closing fairing 300, as more fully described in U.S. Pat. No. 7,604,284, issued on Oct. 20, 2009.

For illustrative purposes, FIG. 1 depicts a Slider with Landing Gear Wrap configuration, although it is understood that this embodiment is used merely to establish nomenclature and identify some of the principal structural elements of the present invention. In this embodiment, Trailer 1 is equipped with repositionable Bogies 7, and as shown the Trailer's Bogies 7 are set in their rear-most position, proximate to the rear of Trailer 1. FIG. 1 also depicts Landing Gear 5 of Trailer 1, which permits a Trailer to sit level and to allow elevation of the Trailer so that a tractor (not shown) can be attached to and detached from a Trailer. The fore-and-aft direction in FIG. 1 and elsewhere in this disclosure is the direction Trailer 1 rolls in, and the transverse direction in FIG. 1 and elsewhere in this disclosure is in the plane parallel to the roadway and perpendicular to the direction Trailer 1 rolls in. The floor of Trailer 1 is generally supported by a number of transversely-oriented support beams under the floor and spanning the bottom of Trailer 1.

Fairing assembly 100 is shown in FIG. 1 on the right side of the Trailer depicted, viewed in the direction of travel. It should be understood that there is a comparable fairing assembly 200 on the left side of the Trailer 1. The purpose of assemblies 100 and 200 is to inhibit the flow of air into and/or exiting from the space between the bottom of the Trailer 1, reduce air flow disruptions underneath Trailer 1, and thereby reduce aerodynamic drag, all as described above. Additionally, as noted, assemblies 100 and 200 in FIG. 1 each has a nose 18 to "wrap" around the Landing Gear, smoothing and directing airflow in this area of the Trailer's underbody. For convenience, this disclosure may sometimes refer to assembly 100 (or 200) only, or to either the components of fairing assembly 100 (or 200) only, it being understood that the two assemblies are minor images of each other but otherwise identical in construction and operation.

Figure 1B:
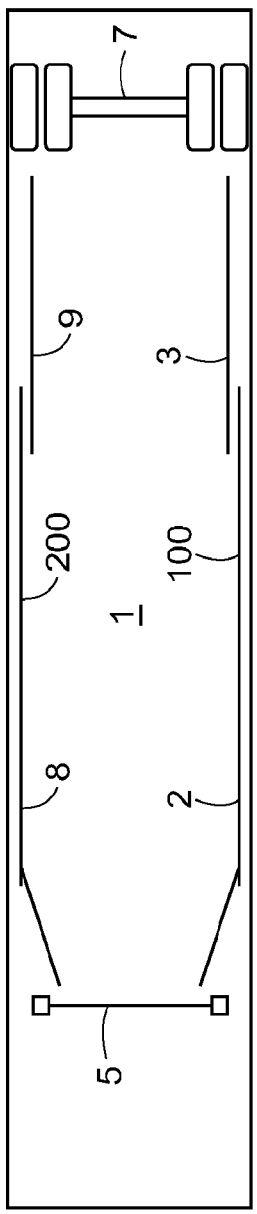
FIG. 1 is a basic schematic perspective view of a Trailer with the vehicle side fairing comprising the present invention depicted thereon.
Figure 1C:
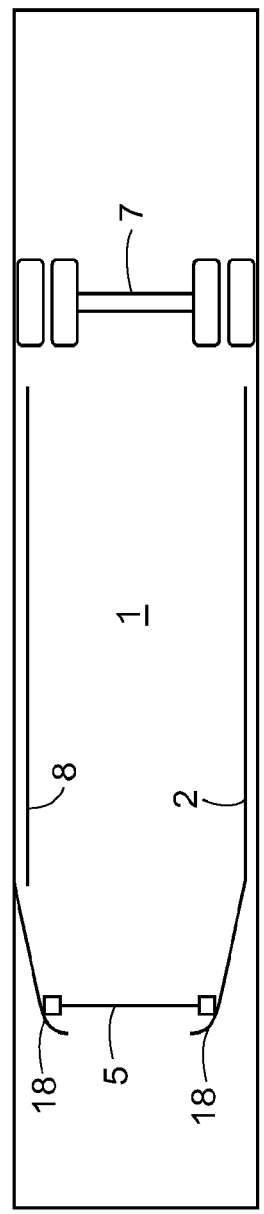
Figure 1D:
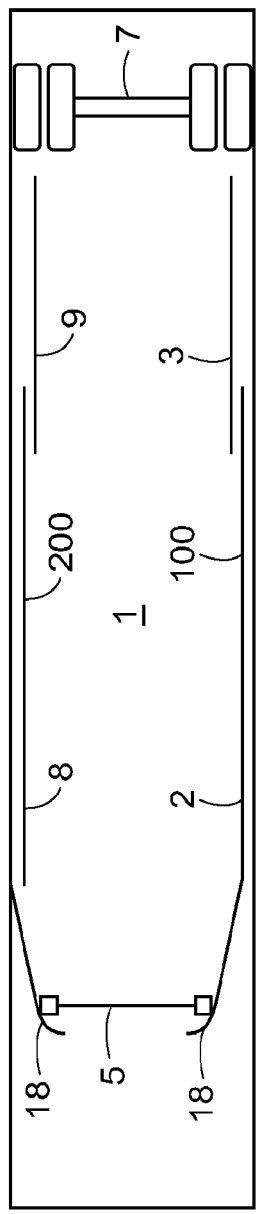

FIG. 1C illustrates the Fixed with Landing Gear Wrap embodiment, and FIG. 1A illustrates the Fixed with Toe-in embodiment. Correspondingly, FIG. 1D illustrates the Slider, with Landing Gear Wrap embodiment, and FIG. 1B illustrates the Slider, with Toe-in embodiment. These different embodiments permit users to select the configuration most suitable to their particular usage and financial needs.

Fairing assembly 100 is generally comprised of either one or two principal panels. If one principal panel, then the fairing assembly comprises panel 2, configured as either a Fixed with Landing Gear Wrap or Fixed with Toe-in fairing. If two principal panels, then the fairing assembly comprises panel 2 and panel 3, with panel 2 located generally forward of panel 3, and panel 3 located generally rearward of panel 2, as shown in FIG. 1. The two principal panel embodiment can be configured as a Slider with Landing Gear Wrap, as depicted in FIG. 1, or as a Slider with Toe-in fairing.

Figure 2:
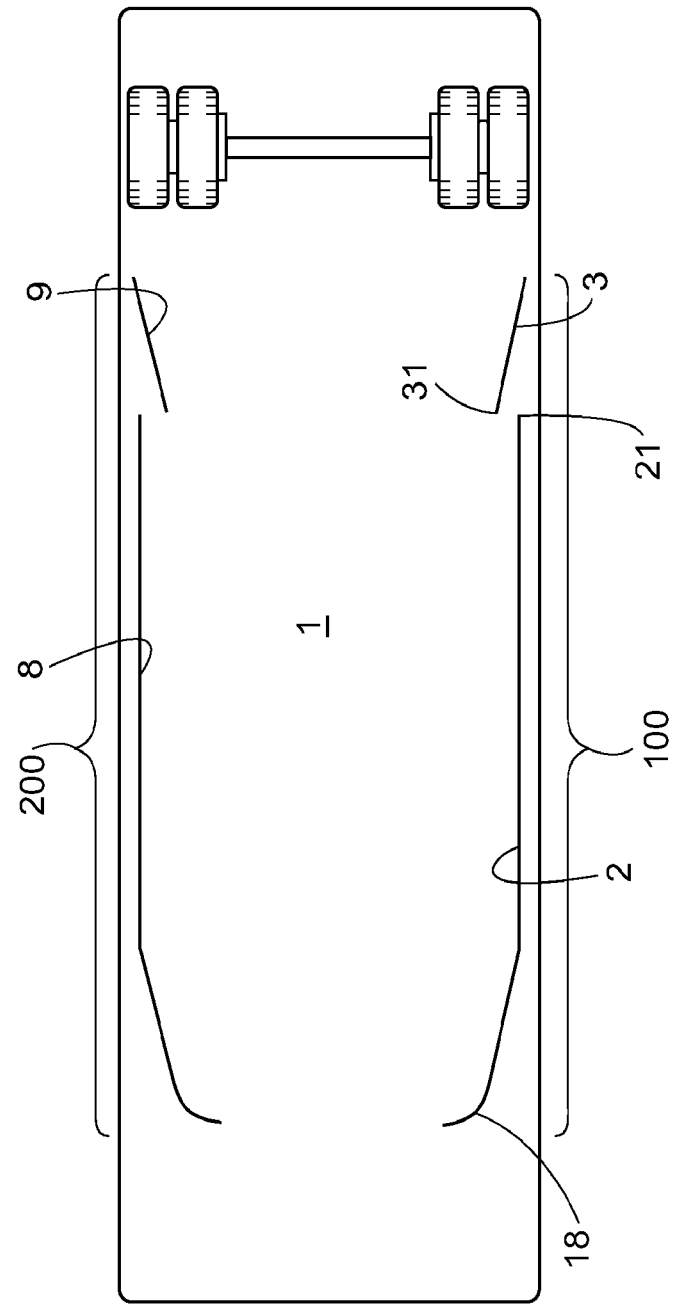
FIG. 2 is a bottom view of a Trailer with the vehicle side fairing comprising the present invention depicted thereon.

The corresponding principal panels of fairing assembly 200 are panel 8 and, if two principal panels are used, panel 9 as well, with panel 8 located generally forward of panel 9, and panel 9 located generally rearward of panel 8 (FIGS. 1B, 1D and 2).

As can be seen in FIG. 1, the Trailer 1 when placed on a road surface defines a spatial gap forward of the Bogies 7 between the bottom of the Trailer and the road surface. In general, panel 2 is secured to the Trailer box at a fixed position proximate to such gap, such as in the gap itself, whereas panel 3, which is generally parallel to panel 2, is coupled to Bogies 7, as described further below. Nose 18 provides further streamlining yet permits access to the landing gear 5.

More specifically, panels 2 and 3, and panels 8 and 9, are generally rectangular planar structures extending in the vertical direction downward to a relatively small distance above the road surface. In one embodiment, approximately 8 inches of clearance is left between the bottoms of panels 2, 3, 8 and 9 and the road.

Panel 2 is secured to the bottom of the box of Trailer 1 approximately equidistant and distal from the longitudinal centerline of the Trailer 1, for example at approximately the periphery of the bottom of the box of Trailer 1. More specifically, panel 2 can be secured to generally maintain an approximately continuous planar surface with the sides of Trailer 1 (although not perfectly continuous). Alternatively, a forward portion or all of panel 2 can be tapered inwardly toward the front of Trailer 1, such that, for example, the front of panel 2 is located inboard of the tractor's tires, and angle back (for example, at approximately 20°) toward the Bogies 7. The embodiments depicted in the figures generally employ a taper.

Figure 3A:
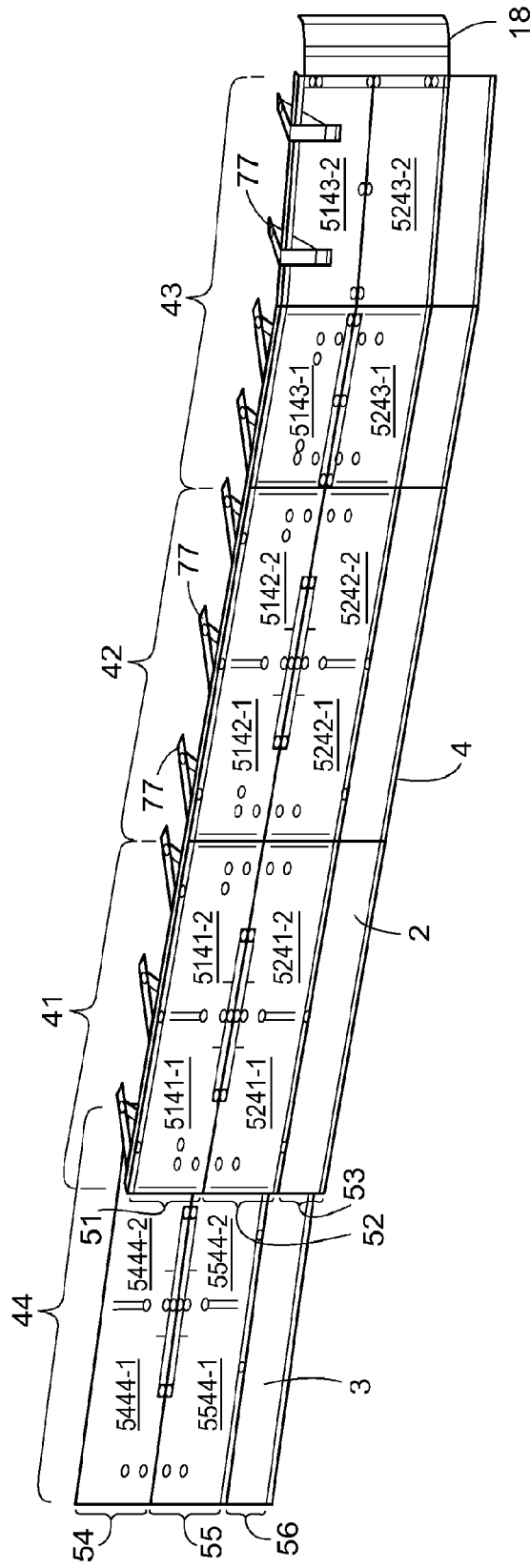
FIGS. 3A and 3B are exemplary depictions of the sections and subsections of the vehicle side fairing panel comprising the present invention depicted thereon.
Figure 3B:
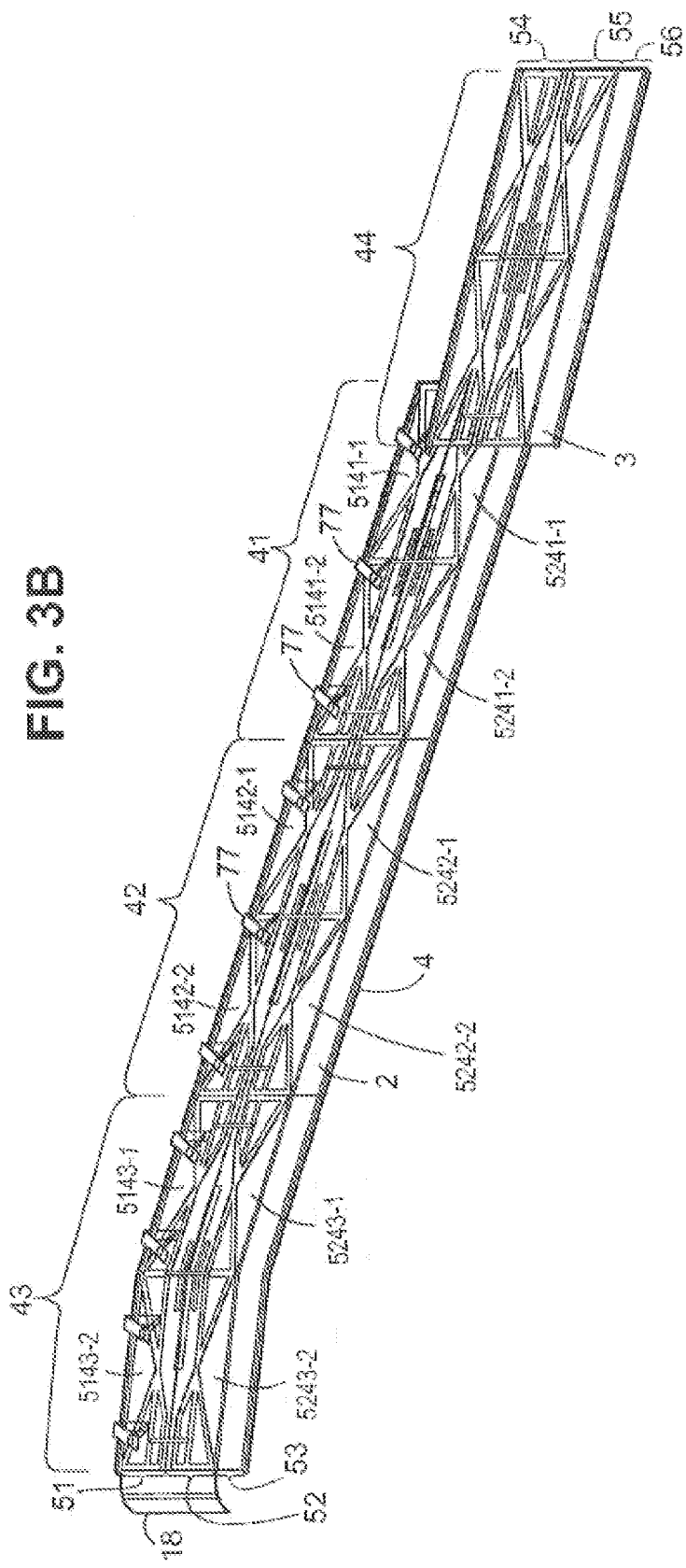

It is preferred that panel 2 be made of two or more sections or segments fastened together in a manner that permits the operator to readily disassemble and remove segments when in service. This aspect of the invention advantageously permits the operator to remove damaged segments, without the need for a service call or other outside assistance. Thus FIGS. 3A and 3B depict panel 2 as made up of sections and subsections, as more fully described below.

The sections and subsections of panel 2 in general are sized to permit relatively easy handling by a single operator. The segments are bolted or otherwise fastened together to permit operator disassembly, for example, by overlapping the sheets and installing nut-bolt sets spaced along the overlapping section, or other fasteners which are removable, and optionally fastenable, by hand or with use of hand tools. Alternatively, rivets or other more permanent fastening methods can be used, or even a one-piece panel can be used in the event field disassembly as described above is not desired.

Front fairing panels 2 and 8 are fixedly secured to the undercarriage structure of the Trailer 1, as described below. Panels 3 and 9 are secured to the Bogies 7 in a manner that causes panels 3 and 9 to move fore and aft as the Bogies 7 move fore and aft. Panels 3 and 9 can be secured to be generally approximately parallel with the sides of Trailer 1 (although not perfectly continuous). FIGS. 1B and 1D depict such a configuration. Alternatively, a forward portion or all of panels 3 and 9 can be tapered inwardly toward the front of Trailer 1, such that the fronts of panels 3 and 9 are located inboard of the rear of panels 3 and 9 (as well as inboard of the rear of panels 2 and 8) and angle back toward the Bogies 7. FIG. 2 depicts such a configuration. The inward tapering need not be linear, but can be progressive or variable, such as to provide for convexly, concavely or otherwise curved panels 3 and 9, as aerodynamic and mechanical considerations may make desirable.

As exemplified by the illustration depicted in FIG. 2, when the Bogies 7 are in their rear most position, the front edge 31 of panel 3 is near the rear edge 21 of panel 2, and overlaps said panel 2. As the Trailer's Bogies are positioned further forward, the front portion of panel 3 comes to further overlap the rear portion of panel 2, with panel 3 preferably overlapping panel 2 as shown in FIG. 2. As stated above, panel 3 is affixed to the Bogies 7 in a manner that causes panel 3 to move fore and aft as Bogies 7 move correspondingly fore and aft. Panel 3, or the forward portion of panel 3, can be optionally inset for example ten inches to permit intermodal operations. The same is the case for panel 8 and panel 9.

As shown in FIG. 3A, panel 2 features upper section row 51, lower section row 52 and impact amelioration section 53. Upper section rows 51 and 52 can be joined in a manner that permits lower section row 52 to rotate, relative to upper section row 51, both inwardly and outwardly up to about 90° in each direction, or more. This feature advantageously allows panel 2 to rotate inwardly or outwardly away (rather than being damaged) when fairing assembly 100 meets obstacles such as raised curbs, snow banks, and the like.

Panel 2 additionally can include a bottom impact amelioration section 53 secured to its lower edge. Correspondingly, panel 3 can include a bottom impact amelioration section 56 secured to its lower edge. The width (measured vertically) of sections 53 and 56 can be increased or decreased as preferred. As shown, the height of sections 53 and 56 is approximately 10 inches. The length of Sections 53 and 56 can vary, as desired.

The purpose of impact amelioration sections 53 and 56 is to further reduce or eliminate damage to panels 2 and 3 that may inadvertently occur if the operator backs down sharply inclined loading docks, or cuts turns too close to raised curbs, or the like. Sections 53 and 56 are fabricated from a sacrificial material, easily replaced when damaged beyond acceptable functionality. Alternatively, sections 53 and 56 can be constructed of a vertically oriented flexible bristle material, a flexible rubber or rubber-like material, TPV material, or any other elastic material which returns to its original position after minor impact. In the preferred embodiment, sections 53 and 56 are each sheet material made from recycled tires and formed in the shape depicted in FIGS. 3A, 3B and 4A. Sections 53 and 56 can be removably mounted with rivets, bolts or the like to permit easy replacement.

The panels 2 and 3 can be fabricated from sheet steel, aluminum, plastic, or other panel material, and fastened to a structural frame of steel, aluminum, plastic or other stock material to enhance rigidity. However, it is preferred that panels 2 and 3 be fabricated of a plastic such as thermoplastic olefin elastomer having gas, foam, or other material injected into it when molten. Such a plastic will have less weight and a lower cost than a comparable, all solid plastic. This plastic will also naturally tend to shed water and minimize snow/ice build-up during inclement winter conditions.

The ability of the present invention to shed snow and ice confers a number of benefits. From an operational standpoint, snow and/or ice build-up causes the weight of the Trailer to increase, which could result in the Trailer exceeding applicable regulatory weight limits Further, movement of the Trailer's Bogies is typically accomplished by the operator locking the Trailer's brakes and then moving the tractor, which causes the box of Trailer 1 to shift backward or forward relative to the Bogies. In the case of such movement, particularly backward movement, any ice or snow build-up could result in damage to the fairing assembly 100, especially in the area where front fairing panel 2 overlaps rear fairing panel 3. Likewise, operator actions to remove snow and ice build-up (such as to enable frozen rear fairing panel 3 to be freed up and moved) are likely to utilize mechanical aids, which could damage the fairing, and/or require sturdier (and heavier) materials. From an aerodynamic standpoint, the build-up of snow and ice, particularly on the exterior portions of fairing assembly 100, can disrupt the aerodynamics of the fairing assembly, and thereby lessen the fuel savings that assembly 100 are intended to confer.

Figure 4A:
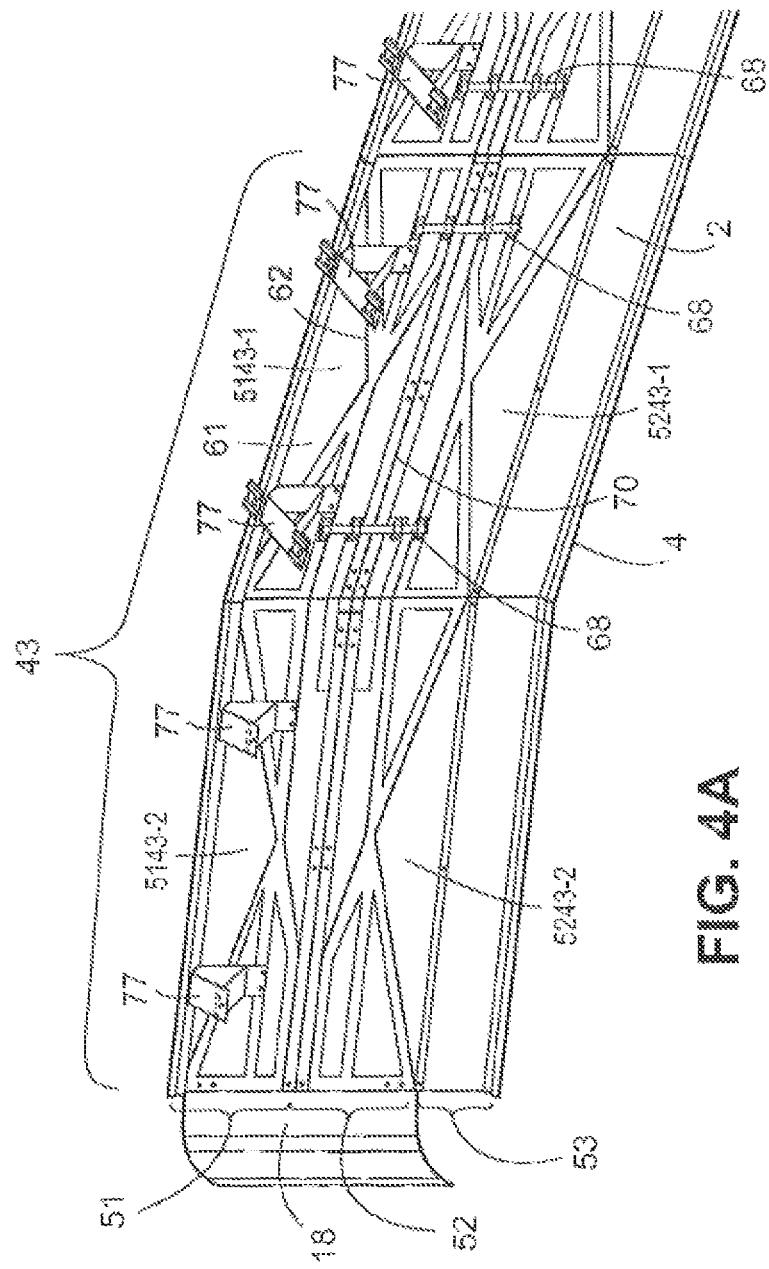
FIG. 4A depicts in more detail the construction of one embodiment of the subsections of the vehicle side fairing panel of the present invention, which includes one means for urging an upper section row back to a coplanar relation with a lower section row of the side panel.

Rows 51 and 52 depicted in FIGS. 3A, 3B and 4A are made in three adjacent sections, denominated 41, 42 and 43 in FIGS. 3A and 3B. Section 43 is the forward-most section, section 41 is the rearward-most section and section 42 is positioned between 41 and 43. Sections 41-43 are in turn made of four subsections, denominated in section 41 as 5141-1, 5141-2, 5241-1 and 5241-2 in FIG. 3. Sections 41 and 42 are identical in construction, coplanar in orientation, and generally flat. Subsections 5143-1 and 5243-1 of section 43 likewise are coplanar with sections 42 and 41. Subsections 5143-2 and 5243-2 similarly can be coplanar with sections 41 and 42, or preferably toed in approximately 15°.

The subsections of each of sections 41, 42 and 43 can each comprise a flat outer subpanel 61 secured to an inner frame 62 to form a rigid yet light-weight semi-monocoque structure (see FIG. 4A). Each of subsections 5141-1, 5141-2, 5241-1 and 5241-2 can be approximately 49.5 inches long by approximately 14 inches deep, or such other dimensions as are preferred, to facilitate replacement in the field.

Alternatively, in a preferred embodiment, a single piece subpanel is used, such as subpanel 63 depicted in FIG. 3C. This subpanel 63 in the currently preferred embodiment is approximately 99.875 inches long by 14 inches deep, and with these dimensions subsections 5142-1 and 5142-2 can be fabricated using one subpanel 63. Likewise, subsections 5242-1 and 5242-2 can be fabricated using one subpanel 63; subsections 5141-1 and 5141-2 can be fabricated using one subpanel 63; and subsections 5241-1 and 5241-2 can be fabricated using one subpanel 63.

Subpanel 63 as depicted in FIG. 3C preferably is made of thermoplastic olefin generally 3 mm thick, with a series of integral stiffening ribs (generally denominated 64) generally 8 mm thick bounding the periphery of subpanel 63 and dividing the subpanel into four sections lengthwise and two sections widthwise, as illustrated in FIG. 3C. Further, the stiffening ribs of subpanel 63 are positioned in a generally symmetrical manner. Thus vertical stiffening ribs 641 are located at approximately at the middle of subpanel 63, and vertical stiffening ribs 642 and 643 are approximately the same distance from vertical stiffening ribs 641 (approximately 20.25 inches in the preferred embodiment), so as to divide subpanel 63 into four sections lengthwise, generally symmetric about ribs 641. Similarly, horizontal stiffening ribs 644 are located approximately at the middle of subpanel 63 so as to divide subpanel 63 into two sections widthwise, generally symmetric about ribs 644.

The use of symmetrically positioned stiffening ribs 64 is advantageous, since it allows the same subpanel 63 to be used on both sides of Trailer 1. In addition, by appropriately locating the stiffening ribs 64, they facilitate the use of the side fairing of the present invention on trailers of different length, such as 48 foot, 53 foot or pup trailers, simply by cutting the subpanel 63 to the appropriate length.

Figure 4B:
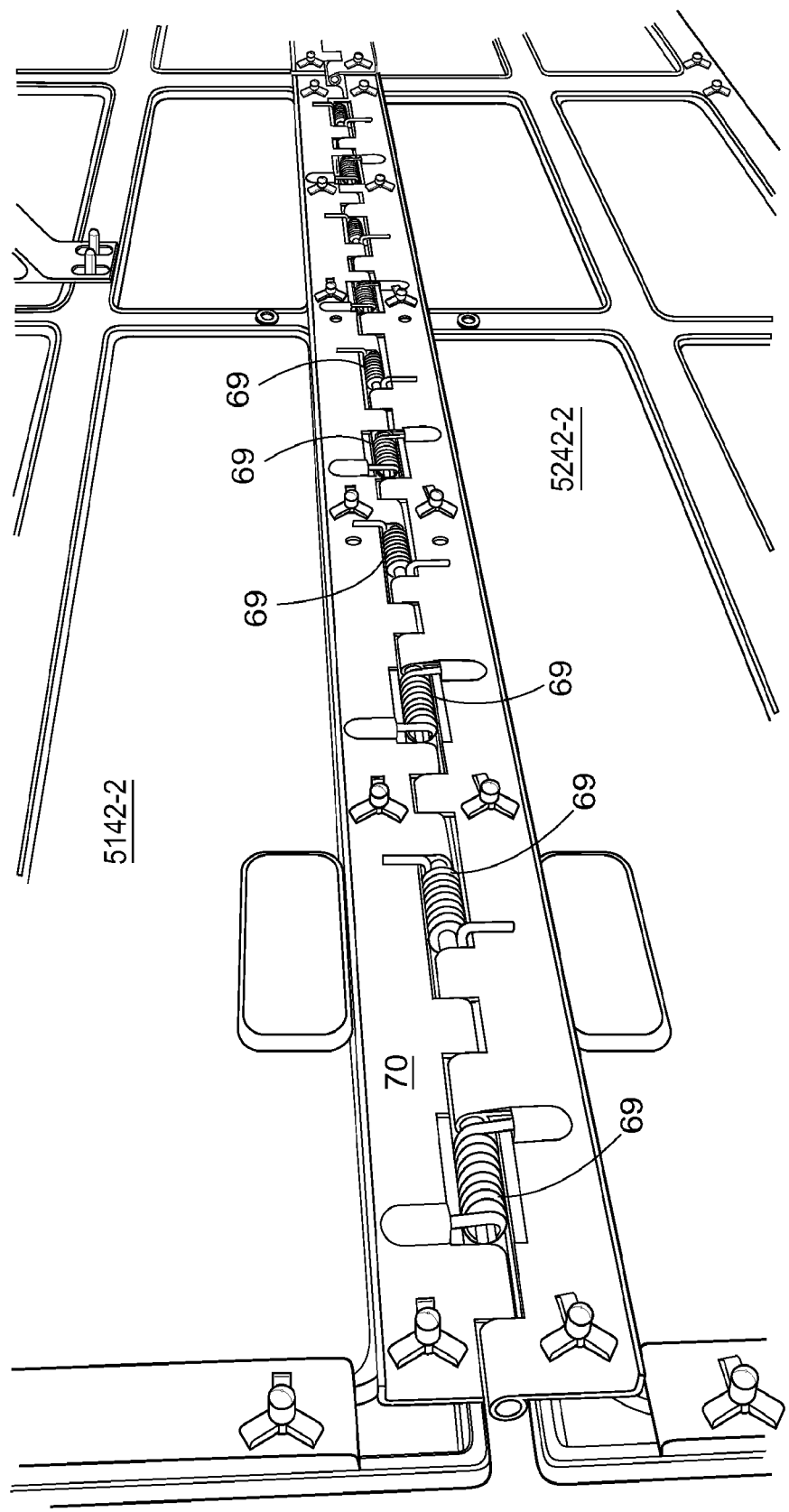
FIG. 4B depicts an alternative, preferred means, for urging an upper section row back to a coplanar relation with a lower section row of the side panel.

FIGS. 4A and 4B depict the construction of panels 2 and 8 in more detail, using a portion of panel 2 for illustrative purposes. In particular, referring to section 43 shown in FIG. 4A, there is shown in FIG. 4A subsections 5143-1, 5243-1, 5143-2 and 5243-2. The lower edge of subsection 5143-1 is fastened to the upper edge of subsection 5243-1 by a bendable or rotatable fastener, such as piano hinge 70 (shown in detail in FIG. 4B) made of for example stainless steel construction.

In comparison, the lower edge of subsection 5143-2 can be rigidly fastened to subsection 5243-2, where the bendable or rotatable movement of subsection 5243-2 relative to subsection 5143-2 is not desired or is dispensed with, as for example to provide for a more rigid mounting of nose piece 18, as depicted in FIG. 4A. In this instance, subsection 5243-1 is not joined to subsection 5243-2, in order to permit the rotation of subsection 5243-1 relative to subsection 5143-1.

Likewise, referring to section 42 shown in FIG. 3B, subsections 5142-1 and 5142-2 are bendably or rotatably fastened to subsections 5242-1 and 5242-2, and in this embodiment, subsection 5142-1 is rigidly fastened to subsection 5142-2, and subsection 5242-1 is rigidly fastened to subsection 5242-2. In a similar manner, referring to section 41 shown in FIG. 3B, subsections 5141-1 and 5141-2 are bendably or rotatably fastened to subsections 5241-1 and 5241-2, and in this embodiment, subsection 5141-1 is rigidly fastened to subsection 5141-2, and subsection 5241-1 is rigidly fastened to subsection 5241-2.

In the embodiment shown in FIG. 3B, subsection 5241-2 is not attached to subsection 5242-1, and subsection 5242-2 is not attached to subsection 5243-1. Correspondingly, impact amelioration section 53 comprises separate sections to permit the desired movement of the lower portions of sections 41 and 42 and subsection 5243-1.

Panels 3 and 9 can be constructed in a manner similar to front fairing panels 2 and 8. Thus, as depicted in FIGS. 3A and 3B for illustrative purposes, rear fairing panel 3 comprises upper section row 54, lower section row 55 and impact amelioration section 56, and further comprises section 44 and four subsections 5444-1, 5444-2, 5544-1 and 5544-2. Subsections 5444-1 and 5444-2 can be attached to subsections 5544-1 and 5544-2 using bendable or hinged fasteners, as described with respect to front fairing panels 2 and 8. In this embodiment, subsection 5444-1 is rigidly fastened to subsection 5444-2, and 5544-1 is rigidly fastened to subsection 5544-2

There is optionally provided means for urging upper section row 51 back to a coplanar relation with lower section row 52 for each section 41, 42 and 43 having bendable or hinged fasteners. For example, there can be provided plural vertically oriented extension springs spanning the intersection of rows 51 and 52 and secured to the corresponding subsections. A number of such extension springs, denominated 68, are depicted in FIG. 4A. These springs urge sections 51 and 52 back into a planar alignment even when the subsections are rotated through up to approximately 90 degrees or more inwardly or outwardly.

A preferred alternative arrangement for urging upper section row 51 back to a coplanar relation with lower section row 52 is shown in FIG. 4B. In this figure, plural torsion springs 69 are axially located within piano hinge 70 and function to urge sections 51 and 52 back into a planar alignment even when the subsections are rotated through up to approximately 90 degrees or more inwardly or outwardly.

Figure 6:
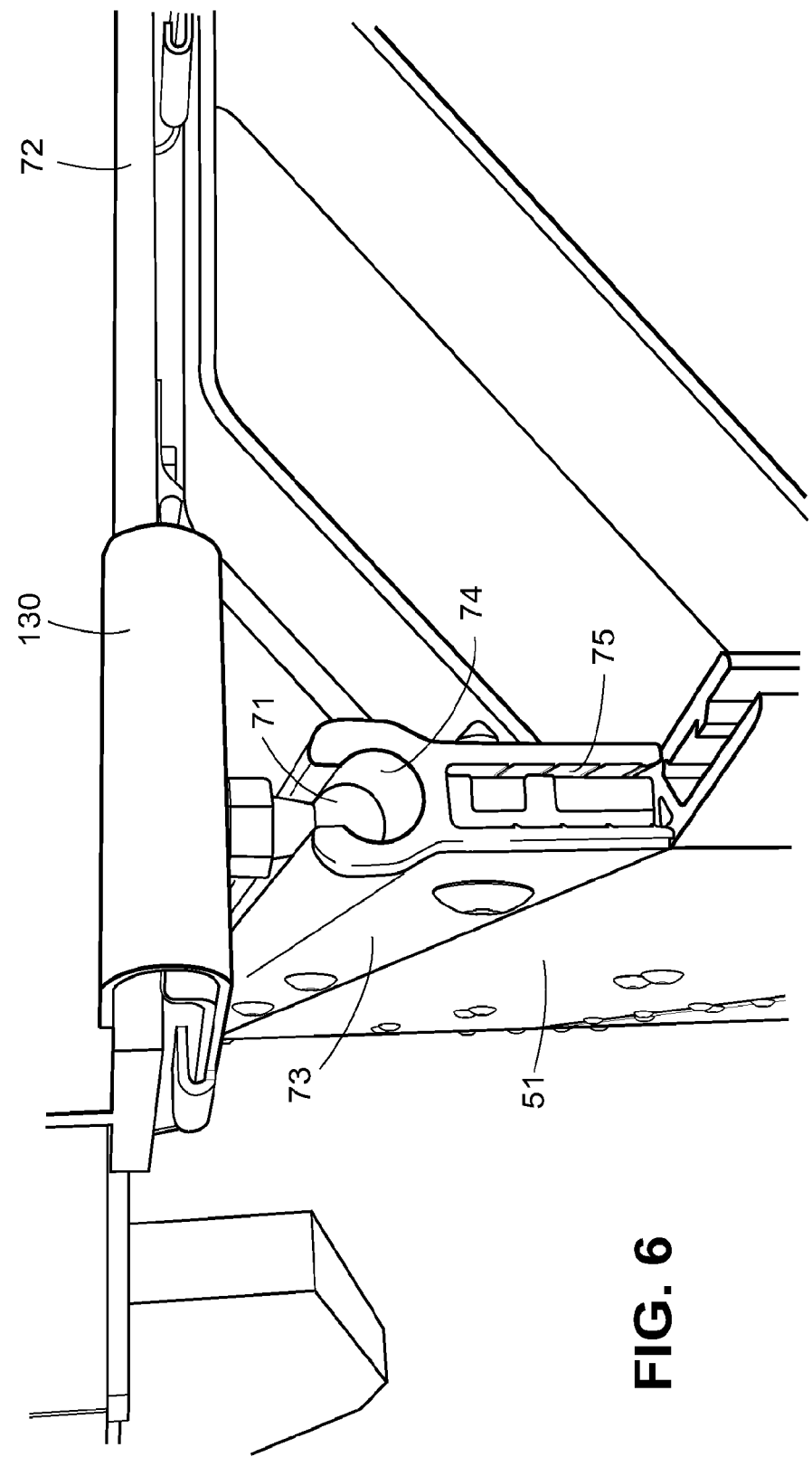
FIG. 6 depicts means for mounting the forward side fairing panel to the Trailer.

Fairing panels 2 and 8 can be attached to Trailer 1 in a variety of ways, as desired. For example, and with reference to panel 2, a plurality of ball mounts can be secured to selected transverse support beams under Trailer 1 at positions consistent with the intended fore and aft positioning of panel 2. An exemplary ball mount 71 mounted to a transverse support beam, specifically I-section floor beam 72, is depicted in FIG. 6. There is then provided an extrusion 73 having an upper channel 74, which is shaped to receive the ball mounts, and a lower channel 75 which receives the top portion of upper fairing row 51 and is secured to upper fairing row 51 with for example stainless steel roll pins, to secure panel 2 to Trailer 1. Additional support brackets 77 are optionally provided to attach upper section row 51 of panel 2 to the transverse beams under Trailer 1 and provide additional rigidity.

In a preferred embodiment of the present invention, the ball mounts are secured to Trailer 1 using a "no-drill" clamping system. In particular, there is provided a number of clamp assemblies 130, one of which is shown in exploded form in FIG. 5. Clamp assemblies 130 each comprises a lower bracket 131 and an upper bracket 132. Lower bracket 131, as shown in FIG. 5, has an inwardly-turned edge 133, an upwardly turned edge 138 and a slot 135, and upper bracket 132 has an inwardly-turned edge 134, two inwardly turned edge portions 136 and an attached weldnut 137 threaded to receive the correspondingly threaded shank 76 of ball mount 71.

Clamp assemblies 130 are assembled by positioning upper bracket 132 between two guide flanges 136 of lower bracket 131 As referred to above, Trailers, as exemplified by Trailer 1, typically have a number of transverse support beams spanning the bottom of the Trailer, such as I-section floor beam 72 depicted in FIG. 6. Thus, each clamp assembly 130 that is being utilized is positioned against the lower flange of a selected floor beam so as to result in inwardly-turned edges 133 and 134 nesting around the lower flange. The threaded shank 76 of each ball mount 71 that is being utilized is received in weldnut 137, and tightened, to result in clamp assembly 130 and ball mount 71 being securely fastened to the I-beam. Ball mount 71 and clamp assemblies 130 are optionally made of a corrosion resistant material, such as stainless steel, which will not cause galvanic deterioration of the Trailer floor beams, which are typically made of steel and/or aluminum.

Rear fairing panels 3 and 9 can advantageously be attached to Trailer 1 in a cantilevered manner; i.e., secured to Trailer 1 by one or more structural components that, from a static load standpoint, reduce to a beam element that is fixed at one end to the panel 3 and fixed at the other end to Trailer 1 (including Bogies 7) at a location or at locations inboard of panel 3, with panel 3 not otherwise secured to or supported by panel 2 or Trailer 1.

Figure 7:
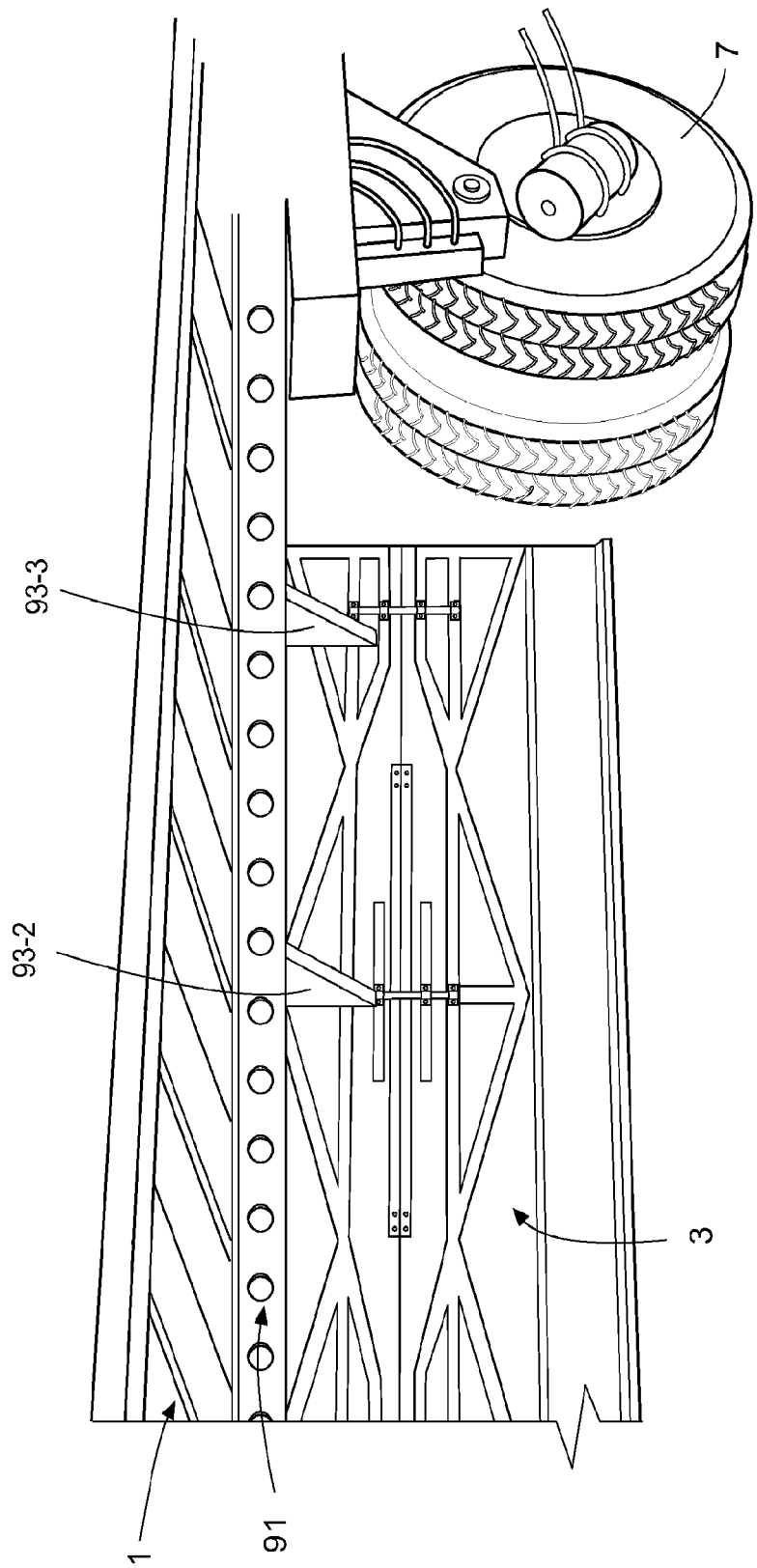
Figure 8:
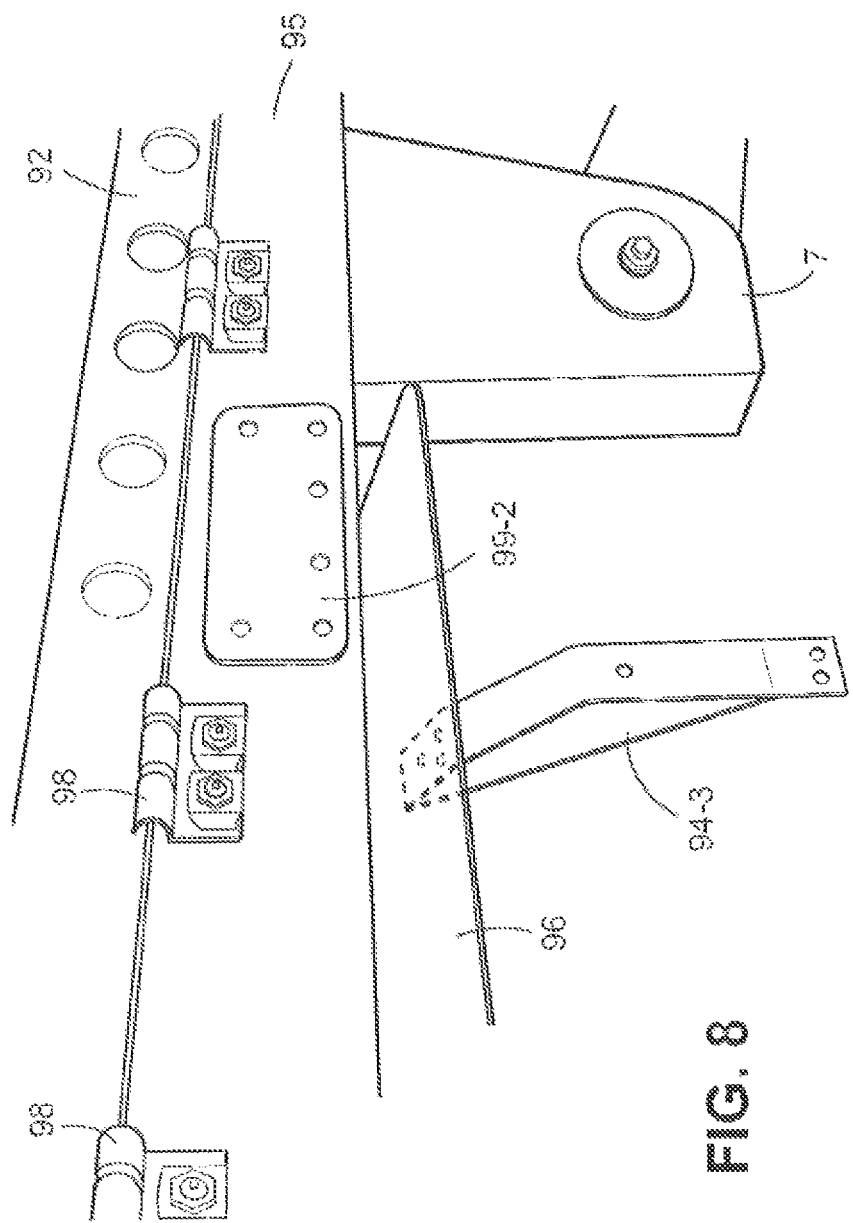

As an example, referring to FIGS. 7, 8 and 9, a plurality of support brackets (generally denominated as support brackets 93 and 94) can be attached to panel 3, and the support brackets in turn can be attached to a beam-like mount that is slidably secured to the existing Bogie wheel rail or beam and rigidly secured to the Bogies 7. Accordingly, FIG. 7 depicts brackets 93-2 and 93-3 attached to rear fairing panel 3 (an additional bracket, 93-1, which is positioned forward of bracket 93-2, is not shown in FIG. 7). Corresponding brackets 94-1, 94-2 and 94-3 are depicted in FIGS. 8 and 9. Brackets 93 are in turn attached to an L-section sliding beam 95 and brackets 94 are attached to L-section sliding beam 96.

Figure 11:
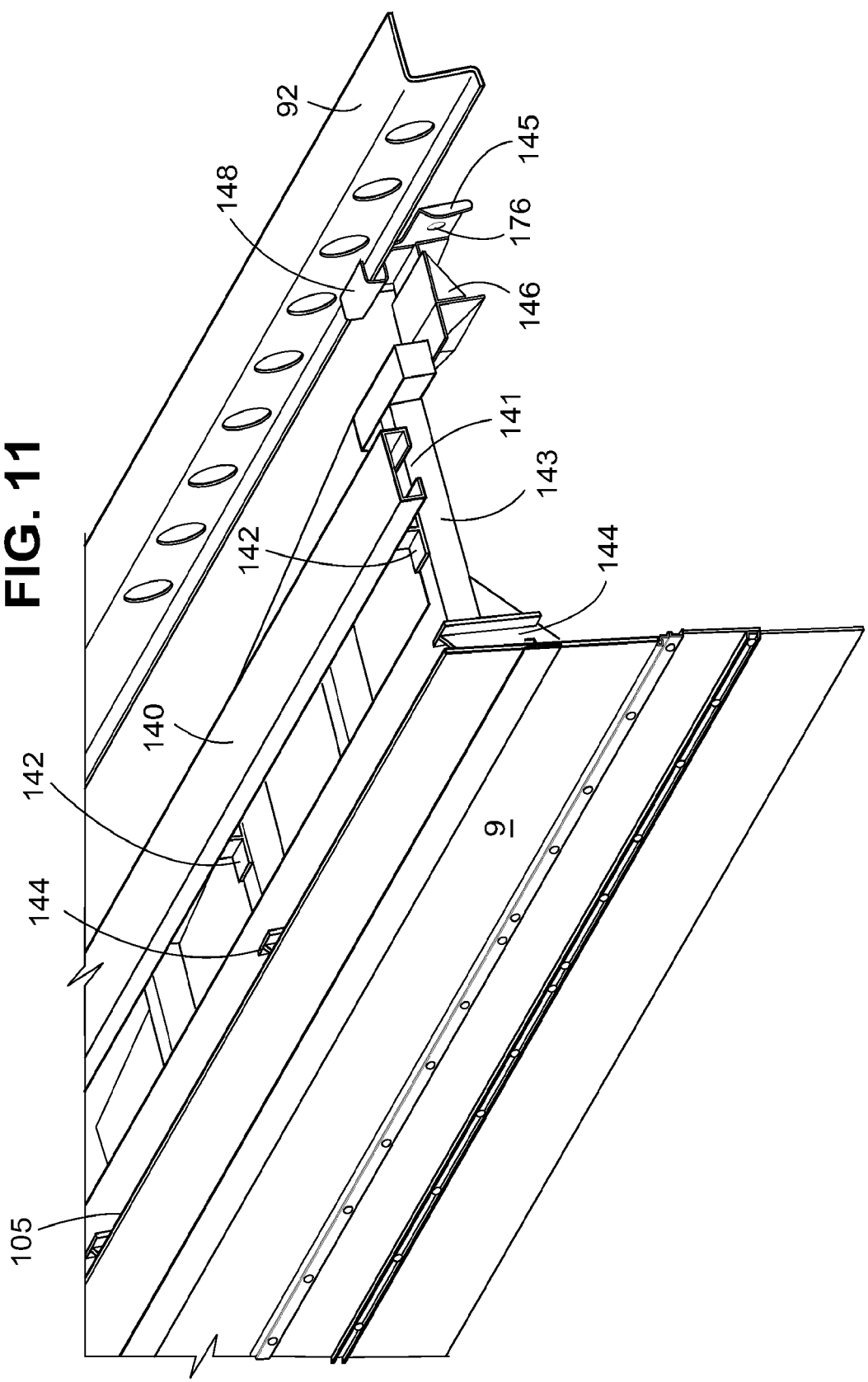

To avoid interference with one or more support brackets 77 when rear fairing panel 3 moves forward, the upper portion of rear fairing panel 3 can be made of a material that yields or elastically deforms upon contact with brackets 77, such as by utilizing vertically oriented flexible bristle material 105, as illustrated in FIG. 11, or resilient sheets or strips, or the like. Also, if preferred each or any of bracket pairs 93-1 and 94-1, 93-2 and 94-2, and 93-3 and 94-3 can be replaced by a single transverse beam spanning Bogie wheel beams 91 and 92; each such beam will of course be cantilevered for that portion of the beam extending outward from Bogie wheel beams 91 and 92.

Beams 95 and 96 are respectively slidably mounted using clamps 98 onto the outwardly extending flanges of existing Bogie wheel beams 91 and 92, which are already provided on Trailer 1 for slidable movement of Bogies 7 fore and aft. Additionally, sliding beam 95 is attached to Bogies 7 via plate 99-1 (not shown), and sliding beam 96 is attached to Bogies 7 via plate 99-2 (FIG. 8). Plates 99 are optionally releasably attached to Bogies 7, as by using quick release fasteners or pins, which permits the operator to slide rear fairing plates forward for access to Bogies 7.

As can be appreciated from the foregoing embodiment, panels 3 and 9 are mounted in a transversely cantilevered manner, since panels 3, 9 are attached to the existing Bogie wheel beams of Trailer 1 and otherwise are free-standing and not fastened to Bogies 7 or panels 2, 8. Alternatively, depending upon the Bogie design, panels 3 and 9 can be mounted in a fore-and-aft cantilevered manner, or in a diagonally or skewed cantilevered manner that resolves into fore-and-aft and transverse load components (i.e., moments about two imaginary lines, one oriented in the fore-and-aft direction and the other oriented in the transverse direction), with panels 3, 9 being suitably fastened to Bogies 7, such as the rear portions of panels 3 and 9 being fastened to Bogies 7. Otherwise, panels 3 and 9 in these fore-and-aft and skewed cantilevered embodiments are free-standing and not fastened to the underside of Trailer 1 or forward fairing panels 2, 8.

An alternative system for attaching panels 3 and 9 to Trailer 1 in a cantilevered manner is depicted in FIG. 11, which illustrates the attachment system for panel 9. Panel 3 is mounted using a comparable arrangement. In particular, in FIG. 11 a support beam 140 is secured using clamp assemblies (as shown in FIG. 5, employing a bolt fastener in place of a ball mount) to plural I—section floor beams (not shown) of Trailer 1. Support beam 140 is a rectangular channel section with a downward-facing open slot 141 oriented parallel to the direction in which panels 3 and 9 will slide.

Figure 14A:
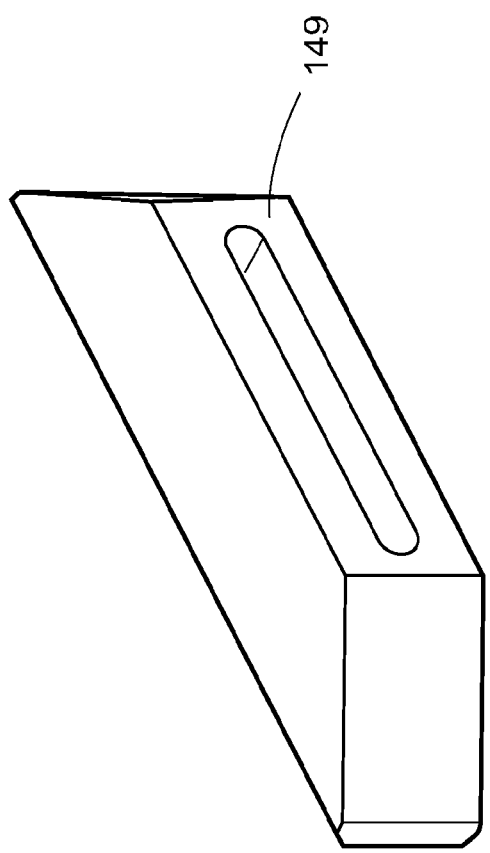
FIG. 14A depicts the configuration of a shoe 149 to facilitate sliding.

The upper flange of each of two or more connecting I-beams 142 rides in the slot, and each side of each upper flange is provided with a shoe made of a material having a low coefficient of friction such as Delrin®, to make sliding easier and promote removal from the rectangular space of snow, ice and road grit. The general shape of a suitable shoe, denominated 149 in FIGS. 14A and 14B, is a tapered block with a slot for receiving a side of a flange. FIG. 14B depicts how the shoes 149 are oriented (long side out) for positioning on each side of each upper flange of I-beams 142. In turn, the lower flange of each of the two or more connecting I-beams 142 is secured to a ladder frame assembly 143, so as to result in assembly 143 being suspended below the floor of Trailer 1 in a slidable manner. The portion of the ladder frame assembly 143 proximate to panel 9 is secured to panel 9 with two or more mitred I-beams 144. The portion of the ladder frame assembly 143 (distal from panel 9) proximate to Bogie wheel beam 92 is attached to beam 92 in a manner that permits a ladder frame assembly to slide by providing a P-bracket 148, a drive plate 145 and a trilateral Bogie rail adjustment assembly 146. Assembly 146 is secured to ladder frame assembly 143 by welds, bolts or the like, P-bracket 148 is secured to trilateral Bogie rail adjustment assembly 146 as described below, and drive plate 145 attaches to the Bogies 7 with a locking pin 175. Accordingly, when Bogies 7 are adjusted fore and aft, the ladder frame assembly 143 moves fore and aft, and in turn, panel 9 moves fore and aft correspondingly.

Figure 10:
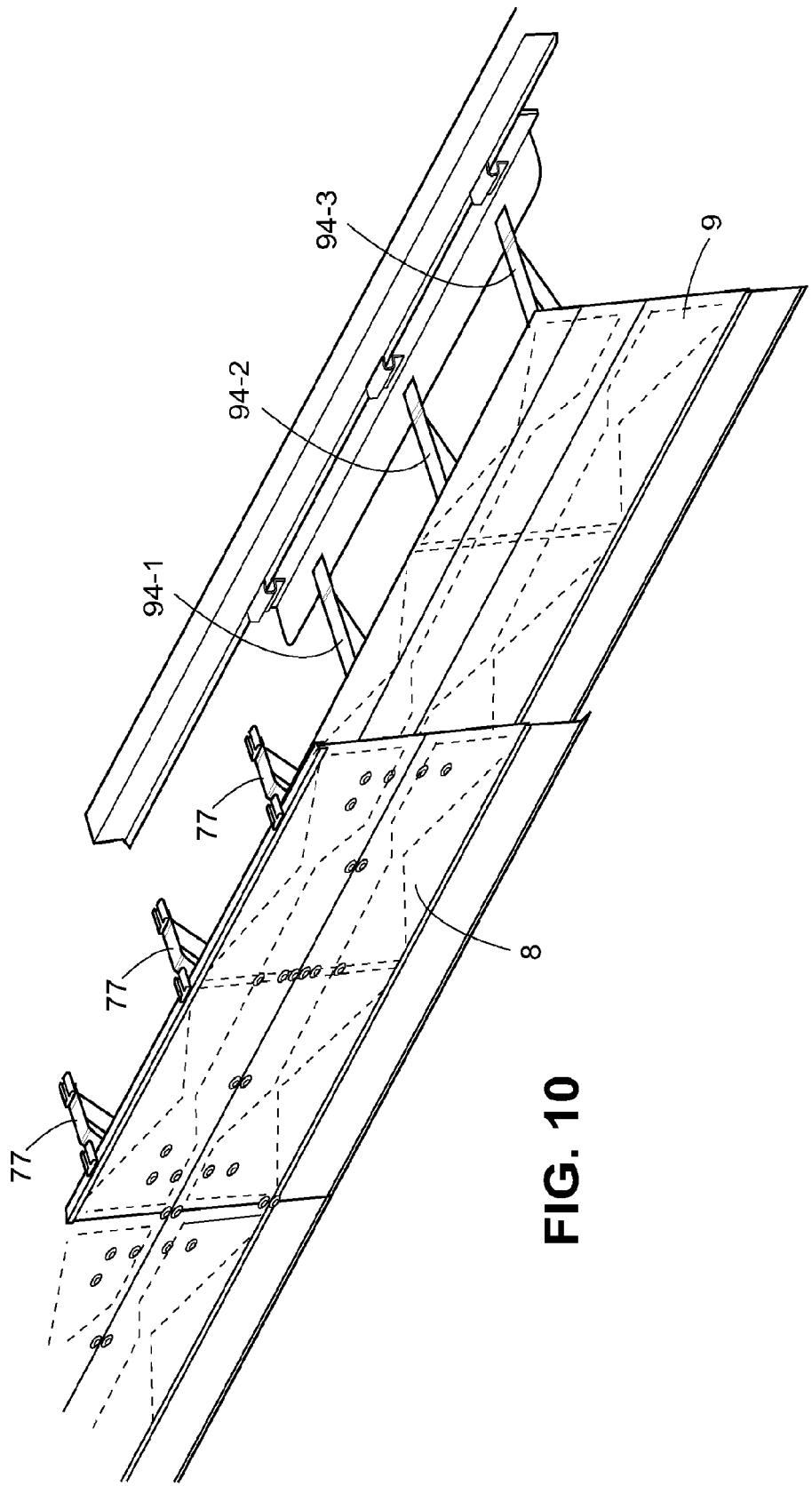

Comparable to the embodiment shown in FIG. 10, to avoid interference with one or more I-beams 144 when panel 9 moves forward, in the embodiment of FIG. 11 the upper portion of panel 9 can be made of a material that yields or elastically deforms upon contact with brackets 77, such as by utilizing vertically oriented flexible bristle material 105, depicted in the location shown in FIG. 11, or resilient sheets or strips, or the like. In the case of employing a subpanel as shown in FIG. 3C, the subpanel 63 can be cut in half along stiffening ribs 644, the upper half can be discarded, and the material 105 can be used in place of the upper half.

Figure 12:
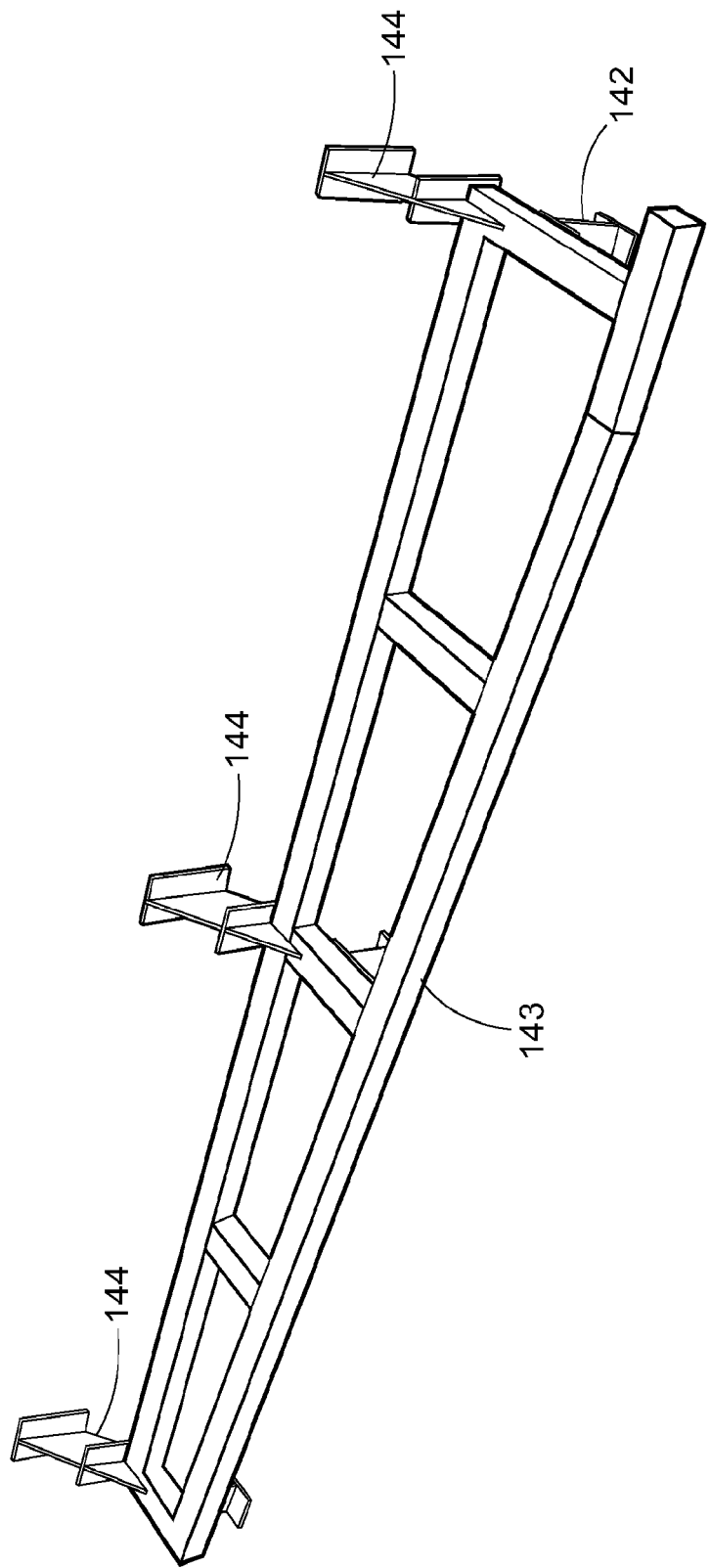
FIG. 12 depicts the ladder frame assembly.

The ladder frame assembly 143 of FIG. 11 is shown in more detail in FIG. 12, which depicts assembly 143 in bottom view. It is made of two inch square weldment and supports the weight of panel 9. The moment that panel 9 produces about I-beams 142 due to its cantilevered positioning is equalized by an opposing moment arising from P-bracket 148 pressing upwardly against Bogie wheel beam 92, as a result of which panel 9 does not experience significant sagging in the truck fore-and-aft direction.

Figure 13B:
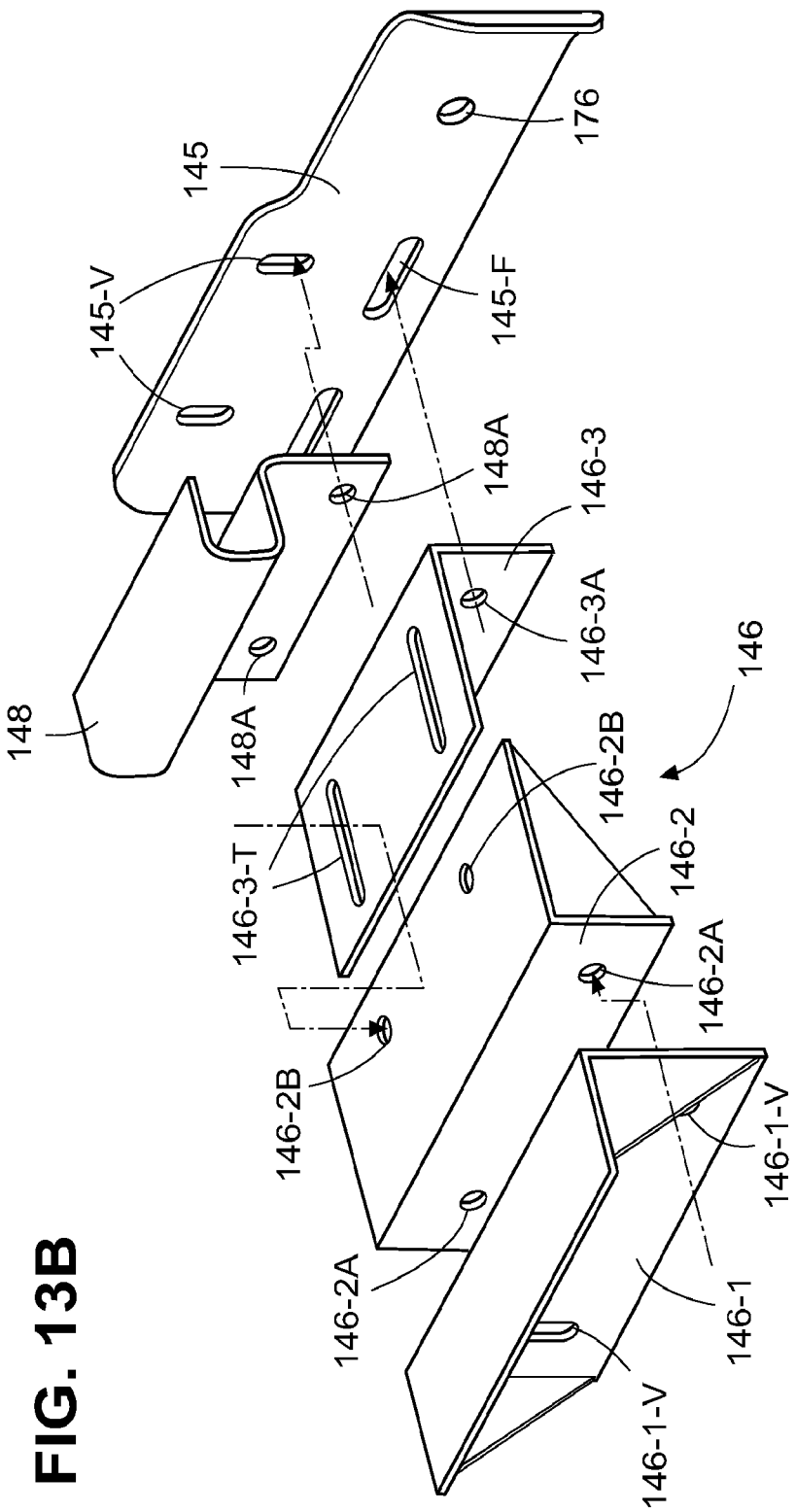
FIG. 13B depicts trilateral Bogie rail adjustment assembly 146 in exploded form.

Trilateral Bogie rail adjustment assembly 146 permits adjustment during assembly of the side fairing of the present invention to Trailer 1, in order to accommodate differences in the manufacture of Trailer 1. As shown in FIG. 13A, and in exploded form in FIG. 13B, trilateral Bogie rail adjustment assembly 146 is assembled from three right angle brackets, denominated 146-1, 146-2 and 146-3, each having two reinforcing gussets at its peripheral edges. Assembly 146 is made by passing two bolts through vertically elongated slot pairs 146-1-V in bracket 146-1, which are received in two holes 146-2A in bracket 146-2, and then securely bolted (with nuts), and by passing two further bolts through transversely elongated slot pairs 146-3-T in bracket 146-3, which are received in two holes 146-2B in bracket 146-2, and then securely bolted.

Two additional bolts are passed through holes 146-3A in bracket 146-3 and received in horizontally elongated slot pairs 145-F in drive plate 145, and then securely bolted.

The utilization of elongated slot pairs 146-1-V, 146-3-T and 145-F permit trilateral Bogie rail adjustment assembly 146 to be adjusted in the vertical, transverse and fore and aft directions, to accommodate differences in the manufacture of Trailer 1.

P-bracket 148 is assembled to drive plate 145 by passing two bolts through holes 148 in P-bracket 148, which are received in vertically elongated slots 145-V in drive plate 145 and then securely bolted. The use of vertically elongated slots 145-V allows further vertical adjustment of P-bracket 148 which nests around the lower flange of Bogie wheel beam 92, as shown in FIG. 13A.

Locking pin 175, shown in FIG. 13A, passes through hole 176 in drive plate 145 and is removably secured in a fastener affixed to Bogies 7. Locking pin 175 can advantageously be released during service to permit panel 9 to be slid forward by the operator without the need to move Bogies 7.

The fairing assemblies disclosed herein can be mounted on Trailer 1 at any time during or after the manufacture of Trailer 1. Mounting the fairing assembly is facilitated by the mounting techniques disclosed herein, which requires no drilling of holes in Trailer 1. Further, the slidable rear fairing assembly described herein can be mounted independent of any front, fixed fairing assembly utilized by Trailer 1. Accordingly, the fairing assemblies disclosed herein can be sold as an aftermarket kit.

It should be understood that the present invention is advantageously utilized in conjunction with the front fairing 12 depicted in FIG. 1, and more fully disclosed in U.S. Pat. No. 7,604,284, and with the rear fairing structure disclosed in U.S. Pat. No. 6,799,791.

What is claimed is:

1. A trailer with a side fairing, comprising:
   a trailer having a trailer box and a wheel set, the trailer when placed on a road surface defining a spatial gap forward of the wheel set between the bottom of the trailer and the road surface;
   the trailer box further including a floor having a plurality of transverse support beams positioned below the floor;
   a fairing panel having an upper portion defining a channel;
   a plurality of ball mounts, each ball mount affixed to a respective transverse support beam, at a fixed position proximate to the spatial gap, the ball mounts received in the channel to secure the fairing panel to the trailer.

2. A trailer with a side fairing as in claim 1, wherein each of the ball mounts is affixed to a respective transverse support beam by a clamping assembly.

\* \* \* \* \*